United States Patent [19]
Yoshinobu

[11] Patent Number: 5,649,284
[45] Date of Patent: Jul. 15, 1997

[54] MULTIPLEX BROADCASTING SYSTEM

[75] Inventor: Hitoshi Yoshinobu, Kanagawa, Japan

[73] Assignee: Sony Corporation, Tokyo, Japan

[21] Appl. No.: 355,132

[22] Filed: Dec. 13, 1994

[30] Foreign Application Priority Data

Dec. 17, 1993 [JP] Japan ................. 5-344233
Dec. 24, 1993 [JP] Japan ................. 5-347327

[51] Int. Cl.[6] ........................................ H04N 7/173
[52] U.S. Cl. ........................ 455/5.1; 455/6.2; 348/12; 348/10
[58] Field of Search .................. 348/13, 12, 7, 348/8, 10, 6; 455/4.2, 5.1, 6.1, 6.2, 6.3; 370/76, 73, 724, 71, 110.1; 379/110, 97, 90; H04N 7/173, 7/16

[56] References Cited

U.S. PATENT DOCUMENTS

| | | | |
|---|---|---|---|
| 4,329,684 | 5/1982 | Monteath et al. . | |
| 4,390,901 | 6/1983 | Keiser . | |
| 4,488,179 | 12/1984 | Krüger et al. . | |
| 4,635,121 | 1/1987 | Hoffman et al. . | |
| 4,706,121 | 11/1987 | Young . | |
| 4,815,128 | 3/1989 | Malek ........................ | 380/9 |
| 4,847,886 | 7/1989 | Chumley ...................... | 379/56 |
| 5,014,125 | 5/1991 | Pocock et al. ............... | 358/86 |
| 5,130,792 | 7/1992 | Tindell et al. ............... | 358/85 |
| 5,151,789 | 9/1992 | Young . | |
| 5,191,410 | 3/1993 | McCalley et al. . | |
| 5,236,199 | 8/1993 | Thompson, Jr. ............. | 273/439 |
| 5,262,860 | 11/1993 | Fitzpatrick et al. .......... | 358/142 |
| 5,267,244 | 11/1993 | Messerschmitt et al. ..... | 370/95.3 |
| 5,357,276 | 10/1994 | Banker et al. ............... | 348/7 |
| 5,438,355 | 8/1995 | Palmer ........................ | 348/13 |
| 5,450,490 | 9/1995 | Jensen et al. ................ | 348/1 |

*Primary Examiner*—Michael H. Lee
*Assistant Examiner*—Chris Grant
*Attorney, Agent, or Firm*—Jay H. Maioli

[57] ABSTRACT

The present invention provides a multiplex broadcasting system and a multiplex broadcast signal receiver for receiving multiplex broadcast signals. The multiplex broadcasting system composes second broadcast information of multi-frequency signals each of a combination of one tone in a first frequency group of audio bands unrelated with each other in articulation and one tone in a second frequency group of audio bands unrelated with each other in articulation, and multiplexes the second broadcast information and main broadcast audio signals. The multiplex broadcast signal receiver comprises decoding means for continuously monitoring the audio signal included in the received multiplex broadcast signal, detecting multi-frequency signals to identify the combination of the multi-frequency signals, receiving means for receiving the output of the decoding means as second broadcast information, and storage means for storing the second broadcast information. The stored second broadcast information is used automatically for accessing a two-way program involving the viewers.

11 Claims, 6 Drawing Sheets

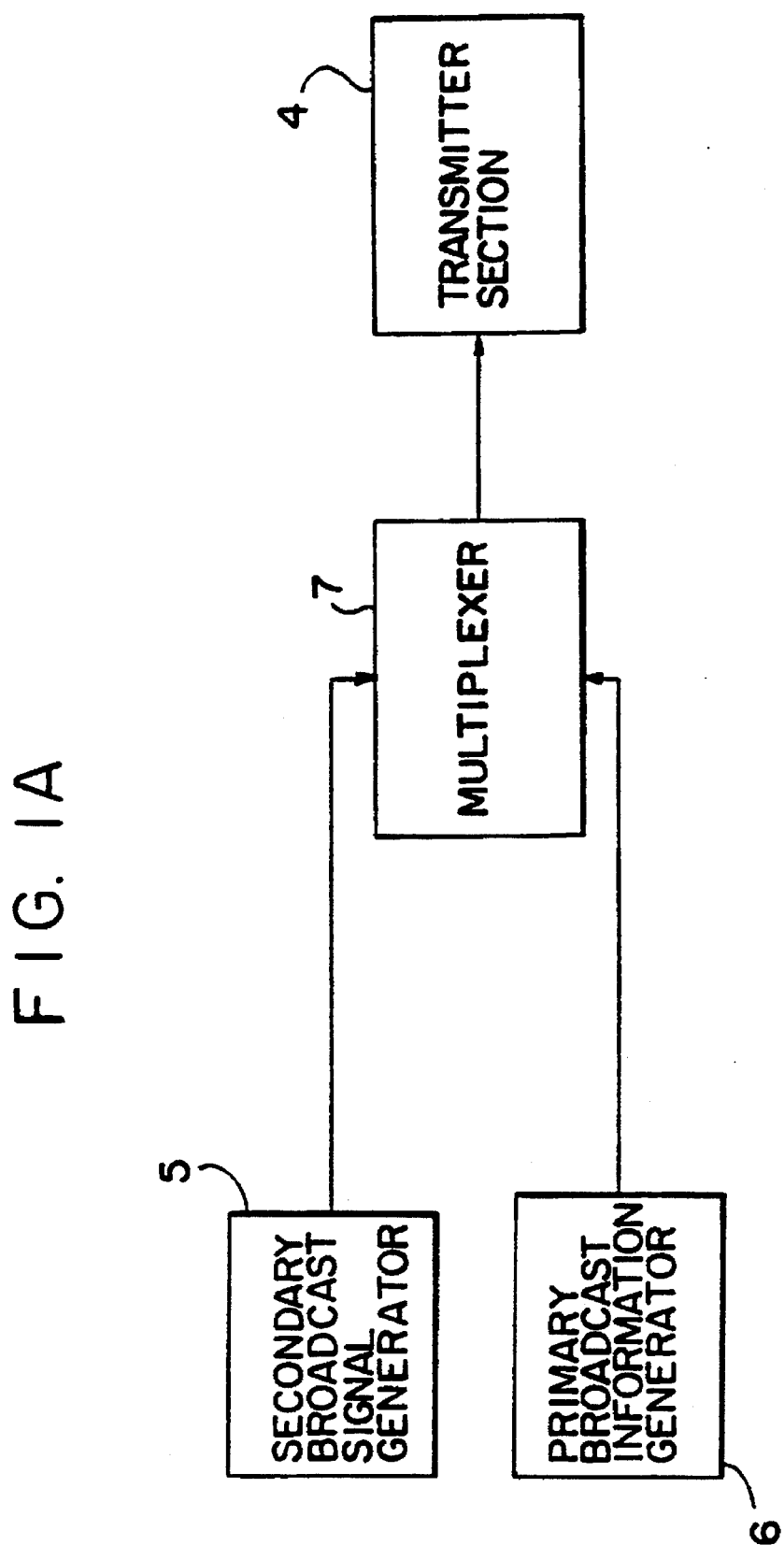
FIG. IA

PROTOCOL FOR TRANSMITTING
DTMF SIGNALS ON TELEPHONE CIRCUIT

| ITEMS | CONDITIONS |
|---|---|
| SIGNAL TRANSMITTING TIME | 50 msec OR ABOVE |
| MINIMUM PAUSE BETWEEN ADJACENT SIGNALS | 30 msec OR ABOVE |
| PERIOD (SIGNAL TRANSMITTING TIME AND MINIMUM PAUSE) | 120 msec OR ABOVE |

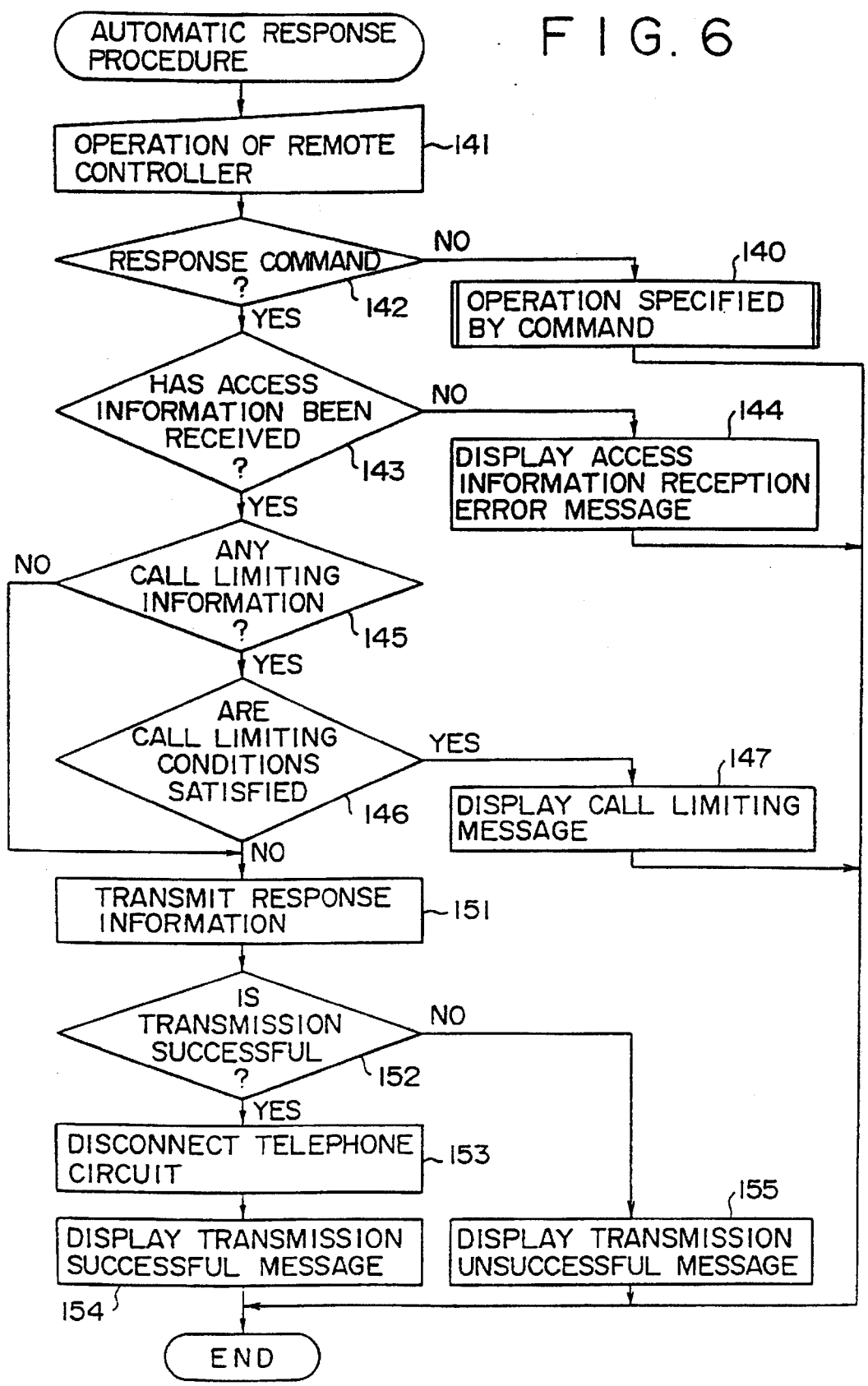

MULTIPLEX BROADCASTING SYSTEM

FIELD OF THE INVENTION

The present invention relates to a broadcasting system suitable for broadcasting multiplex broadcast signals. More particularly, the present invention relates to a broadcasting system for transmitting secondary information, such as telephone number data, which is associated with primary information, such as a television broadcast signal, to a receiver capable of receiving such information. The receiver of the present invention is capable of utilizing received secondary information to initiate communications with a predetermined remote station.

BACKGROUND OF THE INVENTION

When broadcasting TV programs involving TV viewers and requesting responses from TV viewers by telephone, facsimile or the like, such as quiz programs, debating programs, telephone order programs, ticket booking programs, questionnaire programs and fund-raising campaign programs, the broadcasting side often superimposes information for the TV viewers, such as the reception phone number and the account number of the remittee over pictures displayed on the screen for a certain period of time or explains the information by speeches. However, since the information is broadcast in pictures or speeches for a fixed period of time, the TV viewers need to write the information down to keep the information, such as the phone number and such.

If the TV receiver has a picture-in-picture function and a still subscreen function, i.e., a function to display a picture in a subscreen, the information, such as the phone number, can be continuously displayed in a still picture on the still subscreen when the TV viewer selects the still subscreen function. However, the TV viewers must keep writing materials and a memo pad at hand and, even if writing materials and a memo pad are available, it is troublesome to make a note of the information, the unfamiliar phone number and the like may possibly be written down mistakenly or the notes may be lost. Furthermore, even if the TV receiver has a picture-in-picture function, the TV viewers often fail to set the TV receiver in a picture-in-picture mode in time due to delayed picture-in-picture mode setting operation and miss displaying the information.

Incidentally, an experimental two-way broadcasting service commonly referred to as EDS, or Extended Data Service, is being conducted in North America broadcasts, in most cases, information necessary for responding to a broadcast program by a character multiplex broadcasting system, in which information is broadcast in a multiplex mode in the vacant horizontal blanking intervals of vertical blanking intervals, because the information has a large quantity of data including bit map data. However, the TV receiver needs a character multiplexing tuner having a complicated circuit configuration including a waveform equalizer and a data slicer to select character information from broadcast TV signals and to decode the same. Accordingly, the TV receiver equipped with such a character multiplex tuner is necessarily expensive and must be inevitably equipped with different circuits, for example, for the NTSC broadcasting system, the BS broad casting system, the CS broadcasting system and the MUSE broadcasting system.

On the other hand, a TV receiver for receiving information, which is necessary for responding to broadcast programs, broadcast in a two-way broadcasting mode by a character multiplex broadcasting system used in Japan, the TV receiver must be equipped with a character multiplex broadcast tuner provided with a large amount of Japanese font data to meet the Broadcast Law. Therefore, TV receivers for domestic use are generally more expensive than those for export to Western countries where the Japanese font data is typically not needed. Although Direct TV data broadcasting service using one of the channels of satellite broadcasting system is in an experimental stage in Japan, this data channel can be used only by TV receivers equipped with a BS tuner.

SUMMARY OF THE INVENTION

The present invention has been made in view of the foregoing situation of the current multiplex broadcasting system and TV receivers and it is therefore an object of the present invention to provide a multiplex broadcasting system capable of multiplexing a broadcast program and information about the broadcast program so that the receiving side is able to automatically select the information about the broadcast program from the received signals regardless of the broadcasting system by a simple, inexpensive circuit and to use the information easily and surely, and a multiplex signal receiver for receiving multiplex broadcast signals.

With the foregoing object in view, the present invention provides a method of multiplex broadcasting main audio signals and secondary broadcast information including the steps of composing the second broadcast information of multifrequency signals each of a combination of one tone in a first frequency group of audio bands unrelated with each other in articulation, and one tone in a second frequency group of audio bands unrelated with each other in articulation; and multiplexing the multifrequency signals and the main broadcast audio signals.

The present invention provides also a multiplex signal receiver for receiving multiplex broadcast signals each produced by multiplexing a main broadcast audio signal, and second broadcast information composed of multifrequency signals each of a combination of one tone in a first frequency group of audio bands unrelated with each other in articulation and one tone in a second frequency group of audio bands unrelated with each other in articulation, which includes a decoder for continuously monitoring the audio signal included in the received multiplex broadcast signal, detecting the multifrequency signals, and decoding the multi-frequency signals to identify the combination of the multifrequency signals; a second broadcast information receiving means for receiving the outputs of the decoding means as second broadcast information; and storage means for storing the second broadcast information received by the second broadcast information receiving means. The multifrequency signals each produced by combining one tone in a first frequency group of audio bands unrelated with each other in articulation and one tone in a second frequency group of audio bands unrelated with each other in articulation are well-known DTMF (dual tone multifrequency) signals. The present invention uses DTMF signals for composing the second broadcast information, multiplexes the DTMF signals and the main audio signals to provide multiplex broadcast signals, and receives the multiplex broadcast signals. Encoders for encoding DTMF signals and decoders for decoding DTMF signals are used widely in the related field, are inexpensive and are available on the market. Accordingly, transmitters and receivers for multiplex broadcasting can be fabricated at reduced costs.

The present invention provides for a broadcast system in which secondary information, such as telephone number or program schedule information, can be transmitted along with a primary broadcast signal, such as a video/television signal. This secondary signal is multiplexed with the primary signal to produce a multiplexed broadcast signal. The present system incorporates a receiver for receiving the multiplexed broadcast signal. This receiver includes a demultiplexer for separating the secondary broadcast signal/ information from the multiplexed broadcast signal and a storage memory for storing data represented by the secondary multiplexed broadcast signal. The receiver also includes a transmitter for communicating with a predetermined remote station. There is also provided in the receiver, a controller for accessing the data stored in the storage memory and utilizing it to initiate communications with a predetermined remote station via the transmitter. The receiver also includes means for inputting data or command information.

BRIEF DESCRIPTION OF THE DRAWINGS

The above and other objects, features and advantages of the present invention will become more apparent from the following description taken in connection with the accompanying drawings, in which:

FIG. 1A is a block diagram of a multiplex broadcast transmitter in a preferred embodiment according to the present invention;

FIG. 6 is a flow chart of a responding procedure for responding to a two-way broadcast program to be executed by the multiplex broadcast receiver of FIG. 1.

DESCRIPTION OF THE PREFERRED EMBODIMENTS

A multiplex broadcasting system and a multiplex broadcast receiver embodying the present invention will be described hereinafter on an assumption that multifrequency signals forming second broadcast information are DTMF signals.

In one embodiment of the present invention, a broadcasting station transmitts a multiplexed broadcast signal to a remote receiver. the multiplexed broadcast signal is comprised of a primary broadcast signal, such as a video signal, which is multiplexed with a secondary broadcast signal representing information, such as telephone number or program schedule & menu information, which is associated with the primary broadcast signal. The multiplexed broadcast signal is transmitted and received by a receiver. The receiver then demultiplexes the secondary broadcast signal information from the multiplexed broadcast signal and stores the data represented by the signal into a storage memory. Subsequently, this information is called up by a controller in the receiver in response to a user input command from a user input means of the receiver. This information is then used by a transmitter within the receiver to initiate communications with a predetermined remote station specified by the stored data. In one embodiment this stored data represents DTMF telephone number information and the transmitter is a modem device which is responsive to command signals from the controller.

A sending side, i.e., a broadcasting station multiplexes DTMF signals representing second broadcast information relating to a broadcast program, and main broadcast audio signals. A receiving side separates the DTMF signals from the received broadcast audio signals, decodes the DTMF signals to reproduce the second broadcast information, stores the reproduced second broadcast information, and uses the stored second broadcast information for telephone communication with a service station or the like or for presetting a receiver for the future reception of a desired broadcast program.

DTMF Signals

Figures 2, 3:
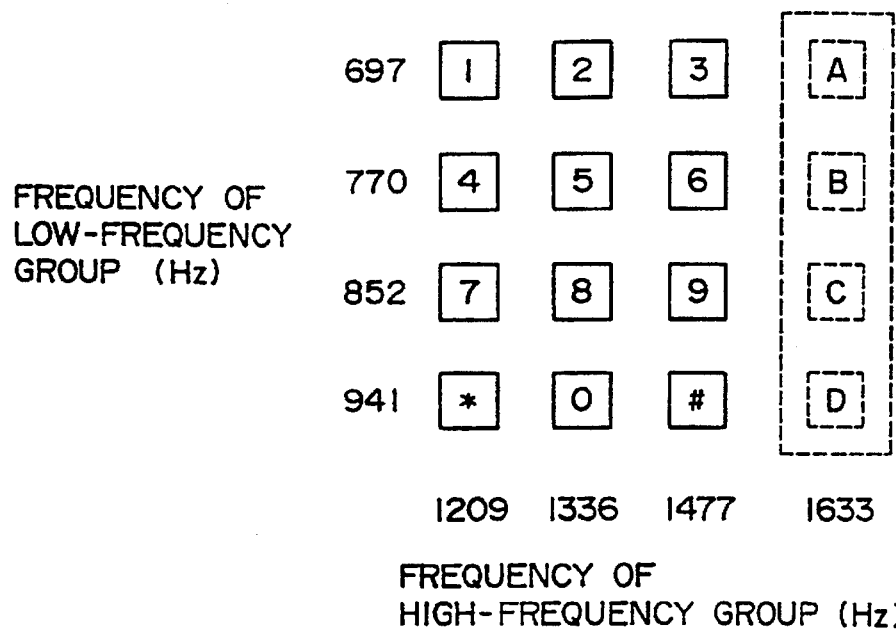
FIG. 2 is a diagrammatic view of assistance in explaining DTMF signals.
FIG. 3 is a table of assistance in explaining conditions for transmitting DTMF signals.
Figure 4:
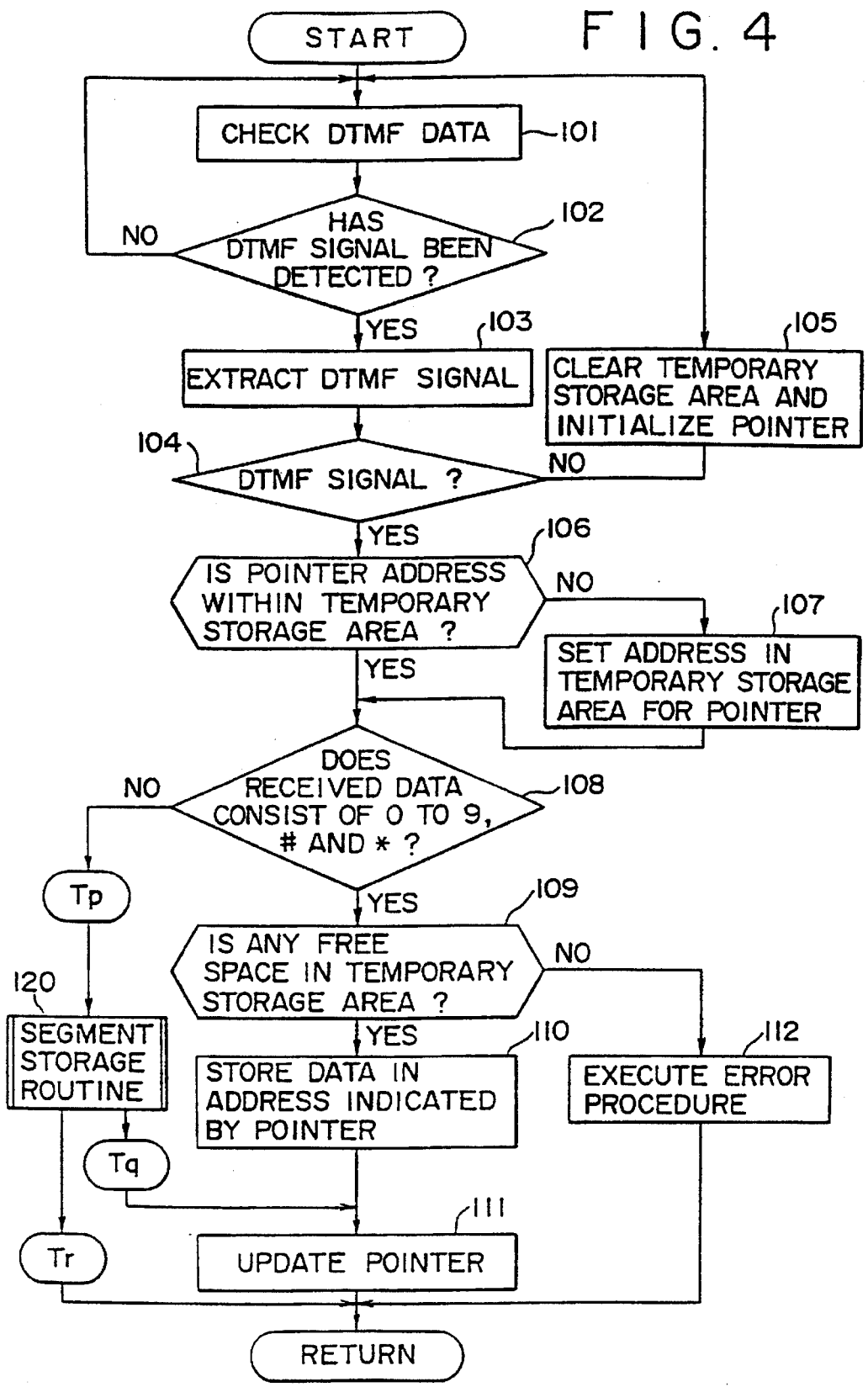
FIG. 4 is a flow chart of a signal receiving procedure for receiving second broadcast information of DTMF signals to be carried out by the multiplex broadcast receiver of FIG. 1.

Referring to FIG. 2, a DTMF signal system is an audio frequency band signal system that transmits a tone of a low-frequency group and a tone of a high-frequency group simultaneously. Each of the low-frequency group and the high-frequency group is comprised of tones in four audio band frequencies unrelated with each other in, articulation. In the DTMF signal system, the four frequencies of the low-frequency group are, for example, 697 Hz, 770 Hz, 852 Hz and 941 Hz, and the four frequencies of the high-frequency group are, for example, 1209 Hz, 1336 Hz, 1477 Hz and 1633 Hz. DTMF signals, i.e., combinations each of one of the frequencies of the low-frequency group and one of the frequencies of the high-frequency group, are assigned respectively to push buttons "0" to "9", "A" to "D", "*" and "#" arranged in four rows and four columns as shown in FIG. 2. Hereinafter, the DTMF signals will be designated as function signals. Telephone communication uses the twelve function signals among the sixteen function signals in combination for expressing subscribers' phone numbers (subscribers' addresses); that is, the twelve function signals are assigned to the numeric keys marked with "0" to "9" and the function keys marked with "*" and "#". The function signals corresponding to the keys marked with characters "A", "B", "C" and "D" and surrounded by dotted lines in FIG. 2 are not generally used in Japan and are used only for data transmission using push buttons.

FIG. 3 shows transmission conditions for transmitting signals to select a line by a phone number represented by the DTMF signals. The combination of the two frequencies and the transmission conditions produces DTMF signals that are scarcely produced in nature and can be clearly discriminated from natural sounds such as voices. Therefore, the DTMF signals and ordinary broadcast audio signals in a multiplex broadcasting mode and the receiver is able to separate the DTMF signals comparatively easily from the broadcast audio signals. A multifunction telephone uses DTMF signals to reproduce, or initiate play back of messages recorded by an automatic answering telephone set installed at one location by operating the push buttons of a push-button telephone set at a place away from the one location to record or reproduce a response message recorded on the automatic answering telephone set and to erase messages recorded on the automatic answering telephone set.

Broadcasting of a Plurality of Pieces of Secondary Broadcast Information

The sending side, i.e., the broadcasting station, uses the function signals "A", "B" and "C" among the function signals "A", "B", "C" and "D", which are not used for PB circuit selection, for indicating second broadcast information transmission start information, and uses the function signal "D" as transmission termination signal. Since there are three kinds of transmission start information, three kinds of second broadcast information can be discriminated. When broadcasting the three kinds of second broadcast information, each of the three kinds of second broadcast information is demarcated with one of the function signals "A", "B" and "C", and the function signal "D". For example, information necessary for responding to a two-way broadcast program, such as the phone number of an accepting telephone circuit, second broadcast information representing a transmission rate is broadcast between a transmission start information, i.e., the function signal "A", and the transmission termination information, i.e., the function signal "D", environment setting second broadcast information representing, for example, a restriction on the last significant digit of the phone number of the responding side and current time-of-day setting, is broadcast between the functional signals "B" and "D", and information about clearing received data is broadcast between the functional signals "C" and "D" in a multiplex broadcasting mode.

The receiving side receives numerical values, symbols and data between the function signal "A", "B" or "C", and the function signal "D" as a second broadcast data row (information group), and stores the second broadcast data rows separately in predetermined storage areas of a storage device. which will be described later.

To give a receiver of interactive television standards version 00 access permission to access an accepting phone number "0990-1234-1234" at a transmission rate of 300 bps, second broadcast information represented by a data row of the function signals, "0#0990*1234*1234" demarcated with the function signals "A" and "D", is transmitted as response access information in combination with main broadcast audio signals in a multiplex broadcasting mode. In this data row, "00" before "#" indicates interactive television standards version 00, and numerical data following "#" indicates the accepting phone number. To give a receiver of interactive television standards version 01 access permission to access an accepting phone number, "0990-1234-1235" at a transmission rate of 1200 bps, a data row of the function signals, "01#0990*1234*1235" demarcated with the function signals "A" and "D" is transmitted as response access information in combination with main broadcast audio signals in a multiplex broadcasting mode. In this data row, "01" before "#" indicates interactive television standards version 01 (transmission rate: 1200 bps) and numerical data following "#" indicates the accepting phone number. In those data rows representing response access information, the symbol "#" is a separator indicating a break between individual data, and the symbol "*" is a pause symbol indicating a pause.

To limit access qualification to only particular phone numbers (subscriber numbers) or TV viewers having particular equipment identification numbers, a data row demarcated with the function signals "B" and "D" is transmitted in combination with main broadcast audio signals in a multiplex broadcasting mode. For example, to give phone numbers the last significant digits of which are "0" access permission to gain access, a data row, "0#0" demarcated with the function signals "B" and "D" is transmitted in combination with main broadcast audio signals in a multiplex broadcasting mode. To give phone numbers the last significant digits of which are "1" access permission to gain access, a data row "0#1" demarcated with the function signals "B" and "D" is transmitted in combination with main broadcast audio signals in a multiplex broadcasting mode. In these data rows, the numeral "0" before the symbol "#" indicates that access permission to gain access is given to phone numbers or identification numbers having the last significant digits equal to the numeral following the symbol "#". To give numbers the last significant digits of which are even numbers access permission to gain access, a data row, 0#0*0#2*0#4*0#6*0#8 demarcated with the function signals "B" and "D" is transmitted in combination with main broadcast audio signals in a multiplex broadcasting mode. In this data row, the symbol "*" indicates logical sum (OR).

To provide time data for presetting the TV receiver for future picture recording, a data row demarcated with the function signals "B" and "D" is transmitted in combination with main broadcast audio signals in a multiplex broadcasting mode. For example to provide time data indicating the current time-of-day, 7:00 a.m., Dec. 15, 1993, Tuesday, a data row, "1#1993121520700" demarcated with the function signals "B" and "D" is transmitted in combination with main broadcast audio signals in a. multiplex broadcasting mode. When a broadcast program is to be broadcast between 7:00 a.m. and 7:29 a.m. on next Sunday, a data row, "10#07000729" demarcated with the function signals "B" and "D" is transmitted. When another broadcast program is to be broadcast between 12:00 a.m. and 2:15 p.m. on next Monday, a data row "11#12001415" demarcated with the function signals "B" and "D" is transmitted. In these environment setting data row, the symbol "#" is a separator indicating a break between individual data and the symbol "*" indicates "OR (logical sum)".

To clear, for example, number restriction, i.e., receiving data clearing information, a data row, "99#0" demarcated with the function signals "C" and "D" is transmitted. To clear accepting phone number, a data row, "99#1" demarcated with the function signals "C" and "D" is transmitted.

Thus, the function signals "A", "B", "C" and "D", which are not used as telephone circuit selecting signals, are used as the transmission start information and the transmission termination information in transmitting second broadcast information. Therefore, even if a DTMF sound is transmitted on a scene of a drama in which a phone call is made, the DTMF sound will not be mistaken for the sound of phone call, and the second broadcast information can be surely transmitted and received.

Figure 1:
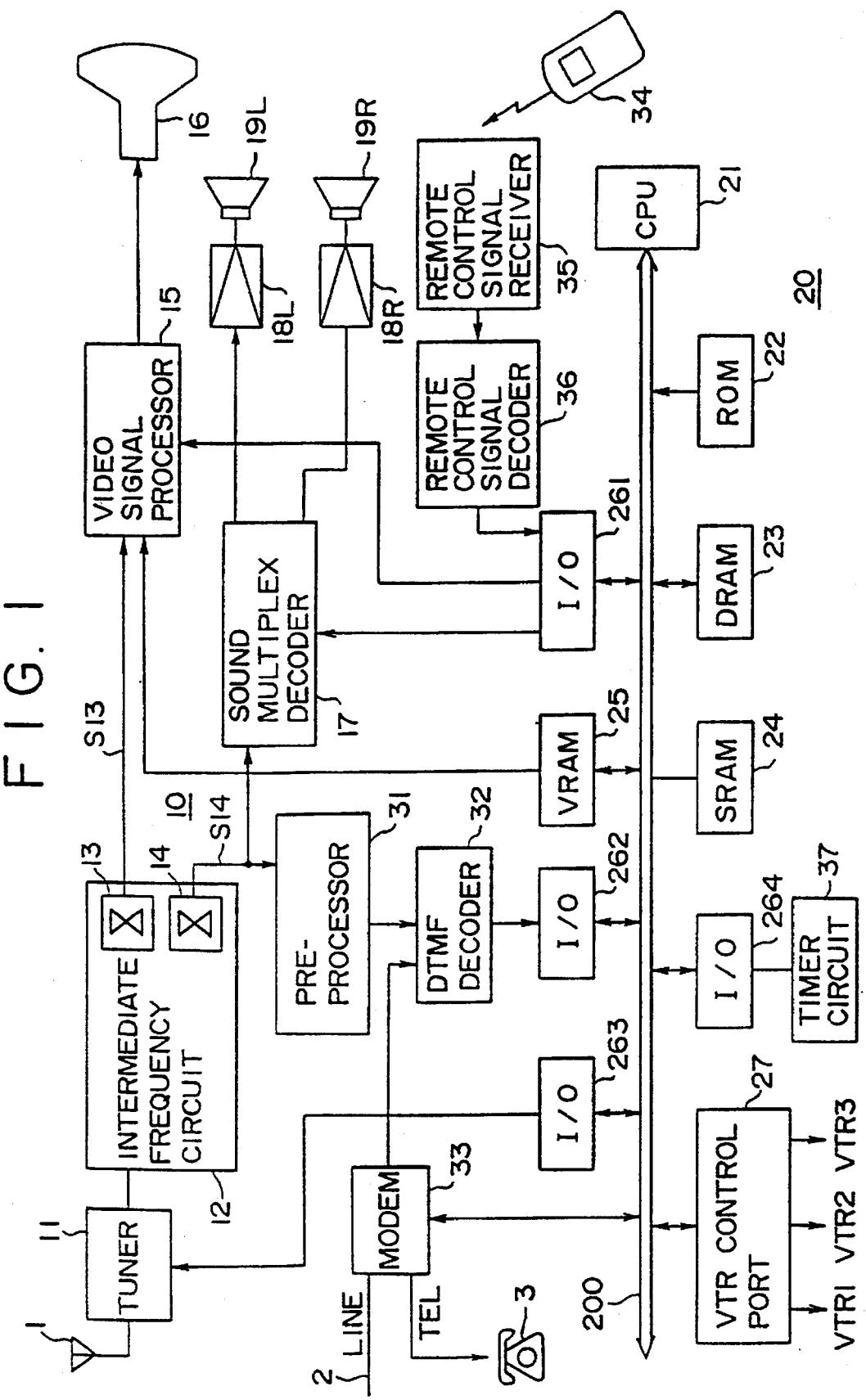
FIG. 1 is a block diagram of a multiplex broadcast receiver in a preferred embodiment according to the present invention.

A TV set oriented to two-way broadcast programs, i.e., a multiplex broadcast receiver, in a preferred embodiment according to the present invention will be described hereinafter with reference to FIGS. 1, 1A, 4, 5 and 6. Referring to FIG. 1, the TV set comprises a signal system 10 and a control system 20 for controlling the signal system 10. Broadcast waves received by an antenna 1 is transferred to a tuner 11. The tuner 11 selects the broadcast signals of a desired channel specified by a channel selection signal given thereto from the control system 20, converts the selected broadcast signals into intermediate frequency signals, and then gives the intermediate frequency signals to an intermediate frequency circuit 12 comprising a video demodulator 13 and an audio demodulator 14. The intermediate frequency circuit 12 demodulates video signals and audio signals. Video signals S13 provided by the video demodulator 13 is transferred through a video signal processor 15 to a picture tube 16. A sound multiplex decoder 17 decodes audio signals S14 provided by the audio demodulator 14 and provides bilingual signals or stereophonic signals SR and SL. Amplifiers 18R and 18L amplifies the signals SR and SL and gives the amplified signals SR and SL to a right loudspeaker 19R and a left loudspeaker 19L, respectively.

The audio signals S14 provided by the audio demodulator 14 is transferred also through a preprocessor 31 to a DTMF decoder 32. The DTMF decoder 32 continuously searches the input signals for DTMF signals included in the input signals. Upon the detection of a DTMF signal, the DTMF decoder 32 decodes the DTMF signal; that is, numerals "0" to "9" and symbols "#", "*" and "A" to "D" are decoded. Data obtained by decoding the DTMF signal is given to the control system 20. The DTMF decoder 32 may be a widely used DTMF decoder available on the market. The preprocessor 31 is used for preprocessing the DTMF signal to enable the DTMF decoder 32, even if the same is an ordinary DTMF decoder available on the market, to decode the DTMF signal in a high accuracy. The preprocessor 31 serves as a filter circuit that removes frequency components other than the DTMF signal from the audio signals S14 to give the DTMF decoder 32 an input signal that can be satisfactorily decoded by a DTMF decoder available on the market.

The TV set is provided with a MODEM 33 for data communications to deal with two-way broadcast programs, such as programs involving TV viewers. The MODEM 33 has a circuit terminal LINE connected to a telephone circuit 2, and a telephone terminal TEL connected to a telephone set 3. The MODEM 33 is connected to the system bus 200 of the control system 20. The output signals of the MODEM 33 is given to the DTMF decoder 32, and the DTMF decoder 32 decodes DTMF signals transmitted through the telephone circuit 2 and gives decoded DTMF signals to the control system.

The control system 20 comprises a CPU 21, a ROM 22, a DRAM 23, a SRAM 24 and a VRAM 25, which are connected to the system bus 200. Stored in the ROM 22 are control programs including a DTMF data receiving and processing program, and fonts graphic data for display. The DRAM 23 serves as a working storage principally for arithmetic operations, the SRAM 24 stores setting information about the TV receiver and ID information, and VRAM 25 stores data for display.

The control system 20 further has I/O ports 261, 262, 263 and 264, and a VTR control port 27. Control signals are transferred through the I/O port 261 to the video signal processor 15 and the sound multiplex data decoder 17. A remote control signal receiver 35 receives remote control signals, such as infrared remote control signals, transmitted by a remote controller 34. A remote control signal decoder 36 decodes the input remote control signals and the decoded remote control signals are transferred through the I/O port 261 to the control system 20. The CPU 21 executes a control operation specified by operating the remote controller 34, according to the control programs stored in the ROM 22. For example, when the remote controller 34 is operated for channel selection and sound volume control, tuning and sound volume control are executed and, at the same time, font data necessary for displaying characters and symbols is read from the ROM 22 and is transferred to the VRAM 25. Then, the data provided by the VRAM 25 is combined with the video signals S13 to display the data on the screen of the picture tube 16 for an appropriate period of time, for example, in a superposed mode. The data for channel selection and sound volume control is stored in the nonvolatile SRAM 24 every time the data is provided to select the same channel and the same sound volume for the so-called last memory function when the main switch is turned on again after the main switch has been turned off.

A channel selection signal is given through the I/O port 263 to the tuner 11. In this embodiment, time data provided by a timer circuit 37 for real-time indication and an interrupt operation at predetermined time is transferred through the I/0 port 264 to the control system 20. In this embodiment, three VTRs VTR1, VTR2 and VTR3 are controlled through the VTR control port 27. The control system 20 gives control signals to the VTRs and receives status signals from the VTRs through the VTR control port 27 to control the VTRs for desired control operations. Each of the VTRs is internally provided with a tuner and an intermediate frequency circuit and is connected, for example, through a distributor to the antenna 1. The control system 20 controls the VTRs for preset picture recording operations.

Referring to FIG. 1A, a block diagram of a broadcast multiplex transmitter is shown in which a transmitter section is depicted as element 4, a means for generating a secondary broadcast signal is depicted as element 5, a means for generating primary broadcast information is depicted as element 6, and a multiplexer is depicted as element 7. In any case, Reception and Processing of Multiplex Information Operations of the TV receiver of FIG. 1 for receiving and processing multiplex information will be described hereinafter with reference to FIGS. 4 and 5.

While the TV receiver is in operation, the preprocessor 31 and the DTMF decoder 32 continuously monitor the audio signal S14 of a broadcast program on the selected channel to search the audio signal S14 for DTMF signals. The CPU 21 monitors the output signal of the DTMF decoder 32 received through the I/O port 262 continuously or periodically in step 101. Upon the detection of a DTMF signal in the audio signal S14 of the currently received broadcast program in step 102, the DTMF decoder 32 decodes the DTMF signal and the output decoded signal D32 representing the numerals and the symbols of the DTMF decoder 32 is given to the CPU 21 in step 103. In step 104, a checking operation is executed to see if the DTMF signal meets transmitting conditions, such as the duration of the DTMF signal is 50 msec or above, a pause between the end of the DTMF signal and the start of the following signal is 30 msec or above, and the sum of the length of the DTMF signal and the pause is 120 msec or above to avoid receiving error data due to radio disturbance and to prevent mistakenly receiving the same frequency components as the DTMF signal accidentally included in ordinary sounds. If it is decided in step 104 that the received data is not that of a DTMF signal, the temporary storage area of the DRAM 23 is cleared and a save pointer is initialized in step 105, and then the program returns to step 101. If it is decided in step 104 that the received data is that of a DTMF signal, a query is made in step 106 to see if the save pointer address is within a temporary storage area. In a state where the TV receiver has been just turned on or the TV receiver is in an error state, the save pointer address is outside the temporary storage area and the response in step 106 is negative. Therefore, an address in the temporary storage area is initialized for the pointer for resetting in step 107 to prevent writing data in the DRAM 23 with an address indicated by the save pointer undefined, causing malfunction or the run-away of the software. If it is decided in step 106 that the pointer address is within the temporary storage area or after an address in the temporary storage area has been initialized for the pointer in step 107, a query is made in step 108 to see if the received data consists of the numerals "0" to "9" and the symbols "#" and "*". If the response in step 108 is affirmative, a query is made in step 109 to see if there is any free space in the temporary storage area. If the response in step 109 is affirmative, i.e., if the pointer indicates an address within the temporary storage area, the received data ("0" to "9", "#", "*") is stored in the address indicated by the pointer in the DRAM 23 in step 110, the pointer is updated by one character in step 111, and then the program returns to step 101 to repeat the steps for checking the DTMF signal. If the response in step 109 is negative, i.e., if there is not any free space in the temporary storage area, an error procedure is carried out in step 112 to clear the temporary storage area and an address in the temporary storage area is initialized for the pointer.

Figure 5:
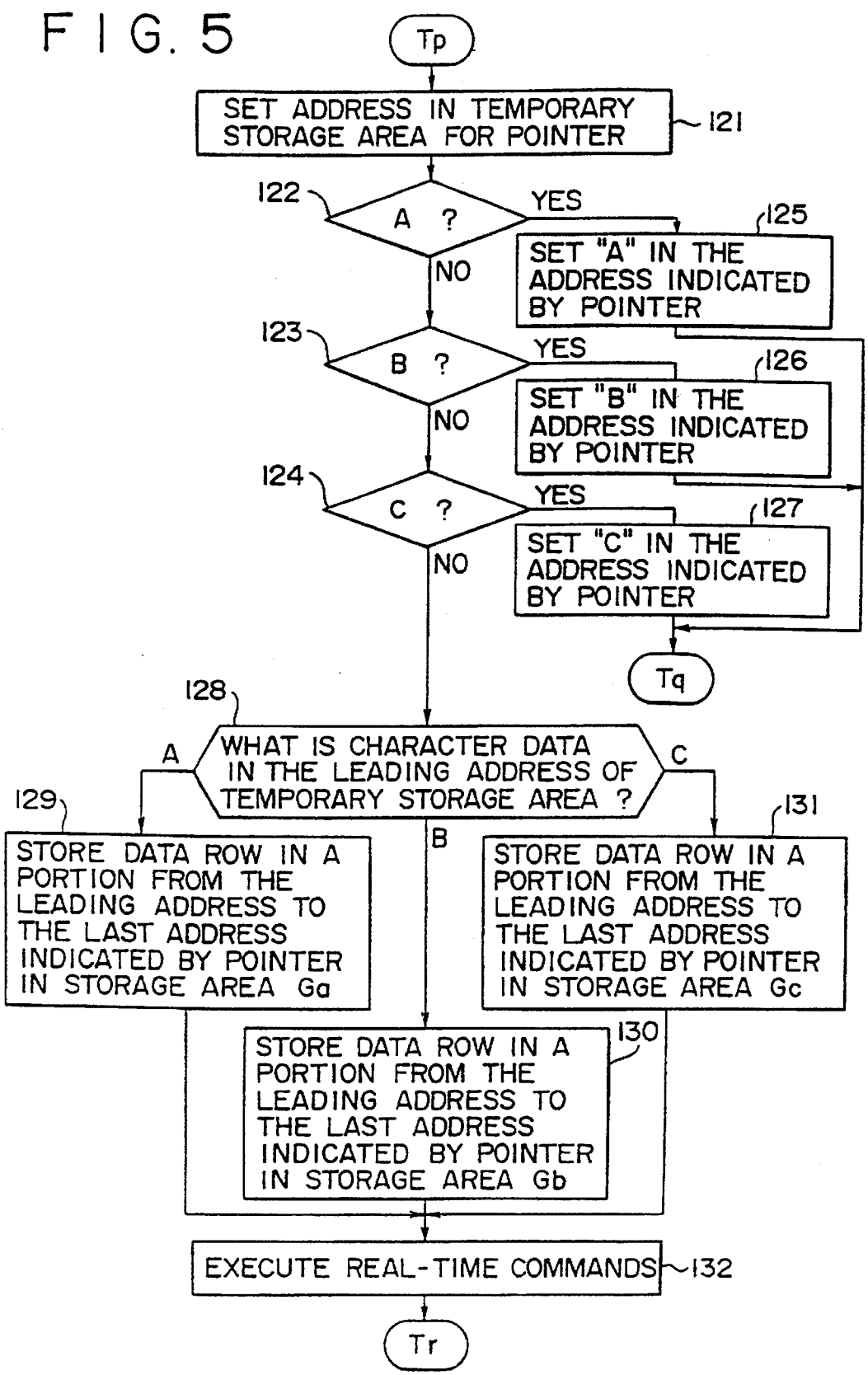
FIG. 5 is a flow chart of a subroutine included in the signal receiving procedure of FIG. 4.

If the response in step 108 is negative, i.e., when the received data is not represented by the numerals "0" to "9" and the symbols "#" and "*", the received data is one of the function signals "A", "B", "C" and "D" corresponding to the aforesaid four function signals. Then, a segment storage routine shown in FIG. 5 is executed in step 120. In step 121, the leading address of the temporary storage area is set for the pointer, and then queries are made sequentially in steps 122, 123 and 124 to see if the received data is the function signal "A", "B" or "C". If it is decided in step 122 that the received data is the function signal "A", in step 125, "A" is set in the address indicated by the pointer. If it is decided in step 123 that the received data is the function signal "B", "B" is set in step 126 in the address indicated by the pointer. If it is decided in step 124 that the received data is the function signal "C", "C" is set in step 127 in the address indicated by the pointer. After the step 125, 126 or 127 has been executed, the program returns to step 111 to update the pointer by one character. Then, the program returns to step 101 to repeat the steps for checking the DTMF signal.

When all the responses in steps 122, 123 and 124 are negative, it is decided that the received data is the function signal "D", and then the data stored in the temporary storage area by that time is processed as one data row (information group).

Since the broadcasting side transmits the function signal "A", "B" or "C" as a transmission start signal when transmitting a DTMF signal, function signal "A", "B" or "C" is stored in the leading address of the temporary storage area after steps 125 to 127 have been executed. Therefore, a query is made in step 128 to see if the character data stored in the leading address of the temporary storage area is "A", "B" or "C". If the function signal "A" is stored in the leading address storage area, a storage area, a data row in a portion from the leading address to the last address indicated by the pointer is stored in a corresponding storage area Ga in step 129. If the character data "B" is stored in the leading address of the temporary storage area, a data row in a portion from the leading address to the last address indicated by the pointer is stored in a corresponding storage area Gb in step 130. If the character data "C" is stored in the leading address of the temporary storage area, a data row in a portion from the leading address to the last address indicated by the pointer is stored in a corresponding storage area Gc in step 131. These storage areas Ga, Gb and Gc are set in the DRAM 23 or the SRAM 24, which will be described later.

In step 132, the received data row is evaluated and analyzed. If the information stored in the storage area Ga, Gb or Gc is a command which must be executed in receiving signals, a procedure corresponding to the command, such as a procedure for partly or completely clearing the received data, a procedure for setting the timer for the current time-of-day or a procedure for selecting a menu to be displayed, is executed, and then the program returns to step 101 to repeat the steps for checking the DTMF signal.

The foregoing multiplex data receiving procedure monitors the audio signal of a broadcast program continuously, regards a data row demarcated with the function signals "A" and "D", "B" and "D" or "C" and "D" as one piece of information, segments the information according to the type of the information, and automatically stores the segments of the information in separate storage areas Ga, Gb and Gc to classify and store the received information. For example, the received signal is regarded as information connected with accessing a two-way program and is stored in the storage area Ga when the data row starts with the function signal "A", the received signal is regarded as information connected with environment setting and is stored in the storage area Gb when the data row starts with the function signal "B", and the received signal is regarded as information connected with clearing received data and is stored in the storage area Gc when the data row starts with the function signal "C".

Temporary information for dealing with a two-way program, such as the information connected with response access, may be cleared upon the reception of a number clear signal. However, since it is possible that the channel is changed before the reception of the clear signal, it is desirable to clear old numbers when the TV receiver is turned off. Therefore, the information connected with response access may be stored in the DRAM 23; that is, the storage area Ga may be set in the DRAM 23. The information connected with environment setting includes time data for use in presetting the TV receiver for future program reception or future picture recording, and the time data of the selected program must be stored for a comparatively long period of time, such as one week. Accordingly, it is preferable to store the information connected with environment setting in the nonvolatile SRAM 24. In this embodiment, the storage areas Ga, Gb and Gc are set in the volatile DRAM 23 or the nonvolatile SRAM 24 according to the characteristics of data to be stored therein, such as the term of storage and the mode of clearing. When carrying out a response procedure by a simple interactive television receiver using an ordinary telephone circuit, necessary information including the phone number and communications conditions can be automatically read from the storage area Ga in the DRAM 23. When presetting the TV receiver for future picture recording, the time information of the selected program transferred from the storage area Gb in the DRAM 23 to the SRAM 24 can be automatically used.

Automatic Response Procedure for Two-way Broadcasting

An automatic response procedure to be carried out by the TV receiver of FIG. 1 will be described with reference to FIG. 6. Referring to FIG. 6, the remote controller 34 is operated to send a control signal to the remote control signal receiver 35 in step 141, and a query is made in step 142 to see if the received control signal is a response command instructing the TV receiver to respond to a two-way broadcast program, such as a quiz program involving TV viewers. If the received control signal is, for example, an ordinary command instructing the TV receiver to change the channel, an operation specified by the received control signal is carried out in step 140. When the control signal is a response command, a query is made in step 143 to see if access information including an accepting phone number and transmission rate has been received and the access information has been stored on the DRAM 23 by the signal receiving procedure of FIGS. 4 and 5. If the response in step 143 is negative, an error icon or an error message indicating that any access information has not been received is displayed on the screen of the picture tube 16 for a fixed time in step 144. If the response in step 143 is affirmative, a query is made in step 145 to see if there is any call limiting information and a query is made in step 146 to see if the call limiting conditions are satisfied. The call limiting condition specifies, for example, the last significant digit of the ID number or the phone number of the TV viewer stored on the SRAM 24. The TV viewer having the specified last significant digit is inhibited from making a call. When such a limiting condition applies to the TV viewer, a massage is displayed to that effect on the screen of the picture tube 16 for a fixed time in step 147. When there is no limiting condition or when the TV viewer falls under a limiting condition, response information is produced by adding the ID number of the TV viewer to response information, a transmission rate is set according to address information, and the response information is transmitted through the MODEM 33 to the predetermined phone number stored on the DRAM 23 in step 151. In step 152, a query is made to see if the transmission is successful, the telephone circuit is disconnected in step 153 when transmission is completed normally, and a message is displayed to that effect on the screen of the picture tube 16 for a fixed time in step 154. If transmission is unsuccessful, a message is displayed to that effect on the screen of the picture tube 16 for a fixed time in step 155.

The broadcasting side is able to control the quantity of responses from TV viewers by placing a restriction, such as a last significant digit limitation, on the qualification of responding TV viewers to carry out two-way broadcasting easily. The TV viewers are able to make a response surely and easily by automatically using the access information reproduced from the received signal.

Generally, the phone number of the telephone set 3 connected to the MODEM 31 is used as the ID number of the TV viewer, it is also possible to use a number set during production, such as the number of a BS decoder, as an ID number. An ID number peculiar to each TV receiver, such as "SONY-01-23456789", is added to an answer, such as "#1", to a question made in a quiz program involving TV viewers. The broadcasting side is able to identify the maker of the TV receiver that is qualified for accessing the broadcasting side from the ID number peculiar to the TV receiver and to use the information thus acquired for determining royalty payment information for telephone charge.

Since this embodiment multiplexes the DTMF signal representing program-related information and the audio signal of a broadcast program, the receiving side is able to employ an inexpensive circuit, such as a mass-produced DTMF receiving IC chip, as the DTMF decoder, and TV receivers provided with such an inexpensive DTMF decoder are less expensive than TV receivers oriented to character multiplex broadcasting. This audio multiplex broadcasting system, differing from the character multiplex broadcasting system, is capable of dealing with various broadcasting systems by using the same circuit and does not influence the conventional broadcasting systems. As is obvious from the period of the DTMF signal, the transmission rate of this embodiment is on the order of eight characters per second, which is far lower than the transmission rate of the character multiplex broadcasting system. However, the quantity of the necessary information is small, no problem will arise even if the transmission rate is not very high.

The current time-of-day, and time information for presetting the TV receiver for future program reception or for future picture recording can be represented by a data row demarcated with the function signal "B" as a transmission starting signal and the function signal "D" as a transmission termination signal, and the data row of the DTMF signal system can be broadcast in the multiplex broadcasting mode. Accordingly, the timer can be simply corrected and the TV receiver can be simply set for future program reception by using the time information. For example, when the transmitted time information includes correct current time-of-day, correction of time-of-day indicated on the timer circuit 37 or the time-of-day clock of the VTR, or setting of the timer circuit 37 or the time-of-day clock of the VTR for correct time-of-day can be easily achieved by using the time information. For example, when the time information is received, the clock of the timer circuit 37 is set automatically for the correct time-of-day included in the received time information.

When the broadcasting side broadcasts a preview of a program and broadcasting time information of the program simultaneously by a DTMF signal system in a multiplex broadcasting mode and the receiving side receives the broadcast DTMF signal representing the preview and the broadcasting time information, data representing the broadcast starting time and the broadcast terminating time of the previously announced program is stored automatically in the storage area Gb of the DRAM 23, and the data representing the broadcast starting time and the broadcast terminating time is transferred to and stored as future picture recording data on the SRAM 24 when the presetting button of the remote controller 34 is depressed within a fixed time interval. In this case, the channel selection data corresponding to a currently selected channel is written in the SRAM 24 and the channel selection data is used also as future picture recording data. Upon the arrival of the broadcast starting time of the program for which the TV receiver was set previously, the timer circuit 37 executes an interrupt operation to start the VTR connected to be control port 27 for picture recording operation. Upon the arrival of the broadcast terminating time of the program, the timer circuit 37 executes an interrupt operation again to stop the VTR to terminate the picture recording operation for recording the program for which the TV receiver was preset. In this picture recording operation for recording the program for which the TV receiver was preset, the TV receiver is started and stopped automatically.

Although the foregoing embodiment uses the function signals "A", "B" and "C" as transmission start information indicating the start of second broadcast information transmission and uses the function signal "D" as transmission termination information, the assignment of the function signals "A", "B", "C" and "D" to transmission start information and transmission termination information is optional.

For example, the use of the function signal "D" as transmissions termination information and the use of repeated combinations and repeated permutations of the function signals "A", "B" and "C" as transmission start information enables the classification of increased kinds of second broadcast information. The transmission termination information also may be any one of repeated combinations and repeated permutation of the function signals.

The transmission start information and the transmission termination information may be combinations of some of the function signals "0" to "9", "#" and "*", or may be combinations of some of the function signals "0" to "9", "#" and "*" and some of the function signals "A" to "D".

Although the present invention has been described as applied to a television broadcasting system and a TV receiver for receiving television signals broadcast by the same television broadcasting system, the present invention is applicable also to an AM radio broadcasting system, a FM radio broadcasting system, a PCM voice broadcasting system, and receivers for receiving radio signals broadcast by the same broadcasting systems. As is apparent from the foregoing description, according to the present invention, the broadcasting side constructs program-related second broadcast information, such as two-way broadcast access data or future program presetting data, by the DTMF signals in an audio band, and multiplexes the second broadcast information and the main broadcast audio signals and, therefore, the receiving side is able to receive and decode the second broadcast information easily by using a DTMF decoder. The decoded second broadcast information is stored in a storage means to eliminate the necessity of writing down an access number to be used to access a program involving TV viewers, which is convenient to the TV viewers.

Since a DTMF encoder available on the market may be employed, and the DTMF signals are superposed simply on main broadcast audio signals, the load on the broadcasting side is smaller than that that is loaded on the broadcasting side when the second broadcast information is transmitted in a character multiplex mode.

The receiving side is able to extract and decode the DTMF signals easily from the output signal of the audio demodulator by using a DTMF decoder available on the market, the receiving set is inexpensive. Furthermore, since the DTMF signals are extracted from an audio signal and decoded, the received signal decoder need not be changed according to the broadcasting system, which is necessary when a character multiplex broadcasting system is employed.

Furthermore, when the decoded second broadcast information is stored in a storage device, the stored second broadcast information can be used for automatically responding to a two-way program by an automatic dialing method and for presetting the receiver for future programs.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A multiplex broadcasting method which multiplexes main broadcast audio signals and second broadcast information, comprising the steps of:
    composing the second broadcast information of multifrequency signals each of a combination of one tone in a first frequency group of audio bands unrelated with each other in articulation and one tone in a second frequency group of audio bands unrelated with each other in articulation; and
    multiplexing the multifrequency signals and the main broadcast audio signals;
    wherein particular combinations among the combinations of the multifrequency signals are transmission start information indicating the start of transmission of the second broadcast information and transmission termination information indicating the termination of transmission of the second broadcast information, respectively, and the second broadcast information is demarcated with the transmission start information and the transmission termination information.

2. A multiplex broadcasting method according to claim 1, wherein the second broadcast information is connected with means for accessing a two-way program.

3. A multiplex broadcast signal receiver for receiving multiplex broadcast signals each produced by multiplexing a main broadcast audio signal, and second broadcast information composed of multifrequency signals each of a combination of one tone in a first frequency group of audio bands unrelated with each other in articulation and one tone in a second frequency group of audio bands unrelated with each other in articulation, said multiplex broadcast signal receiver comprising:
    decoding means for continuously monitoring the audio signal included in the received multiplex broadcast signal, detecting the multifrequency signals, and decoding the detected multifrequency signals to identify the combination of the multifrequency signals;
    receiving means for receiving the output of the decoding means as second broadcast information; and
    storage means for storing the second broadcast information received by the receiving means.

4. A multiplex broadcast signal receiver according to claim 3, wherein the second broadcast information is connected with means for accessing a two-way program.

5. A multiplex broadcast signal receiver according to claim 3, wherein particular multifrequency signals among the combination of the multifrequency signals decoded by the decoding means are detected as transmission start information indicating the start of transmission of the second broadcast information and transmission termination information indicating the termination of transmission of the second broadcast information, respectively, and the row of the multifrequency signals demarcated with the transmission start information and the transmission termination information is stored as the second broadcast information.

6. A multiplex broadcast signal receiver according to claim 5, wherein said second broadcast information is connected with means for accessing a two-way program.

7. A method of broadcasting secondary broadcast information along with primary broadcast information comprising the steps of:
    generating secondary broadcast information associated with primary broadcast information;
    multiplexing said secondary broadcast information with associated primary broadcast information so as to produce a multiplexed broadcast signal;
    broadcasting said multiplexed broadcast signal to a receiver;
    receiving said multiplexed broadcast signal by a receiver;
    demultiplexing said received multiplexed broadcast signal to separate said secondary broadcast information from said primary broadcast information;
    storing said secondary broadcast information into a storage means associated with said receiver; and
    accessing said secondary broadcast information stored in said storage means so as to initiate communications between said receiver and a predetermined remote station;
    wherein said secondary broadcast information comprises multifrequency DTMF signal information representing a telephone number.

8. A method of broadcasting secondary broadcast information along with primary broadcast information according to claim 7 wherein said secondary broadcast information further comprises information representing broadcast program schedule information.

9. A multiplex broadcast system comprising:
    a broadcast station;
    a receiver;
    said broadcast station comprises:
        a transmitter for transmitting a multiplex broadcast signal comprising a primary broadcast signal and a secondary broadcast signal comprising a multifrequency DTMF signal representing a telephone number;
        a multiplexer means for multiplexing said secondary broadcast signal with said primary broadcast signal;
        generating means for generating said secondary broadcast signal;
    said receiver comprises:

means for receiving said multiplex broadcast signal from said broadcast station;

demultiplexer means for separating said secondary broadcast signal from said multiplex broadcast signal;

storage means for storing data represented by said secondary broadcast signal;

user input means for inputting control data;

a modem device for communicating with a remote station; and a controller for controlling said modem device to initiate and establish communications with a predetermined remote station in accordance with control data received from said user input device and said data stored in said storage means.

10. A multiplex broadcast receiver comprising:

means for receiving a multiplex broadcast signal from a broadcast station;

demultiplexer means for separating a secondary broadcast signal from said multiplex broadcast signal;

storage means for storing data represented by said secondary broadcast signal;

user input means for inputting control data;

a modem device for communicating with remote stations; and controller means for controlling said modem device to initiate and establish communications with a predetermined remote station in accordance with control data received from said user input device and said data stored in said storage means;

wherein said secondary broadcast signal comprises a multifrequency DTMF signal representing a telephone number.

11. A multiplex broadcast receiver comprising:

means for receiving a multiplex broadcast signal comprised of secondary broadcast information and a primary broadcast information;

demultiplexer means for separating said secondary broadcast information from said multiplex broadcast signal;

said secondary broadcast information comprises telephone number information in the form of a DTMF signal;

storage means for storing said telephone number information;

user input means for inputting control data;

modem for communicating with a predetermined remote station; and controller means for causing said modem to produce DTMF signals in accordance with said telephone number information stored in said storage means and said control data from said user input device to initiate and establish communications with a predetermined remote station specified by said telephone number information.

* * * * *